(12) United States Patent
Mukhopadhyay et al.

(10) Patent No.: US 11,847,479 B2
(45) Date of Patent: Dec. 19, 2023

(54) ALLOCATING A HOST OF A PRE-CONFIGURED HYPER-CONVERGED COMPUTING DEVICE TO A WORKLOAD DOMAIN

(71) Applicant: VMware, Inc., Palo Alto, CA (US)

(72) Inventors: Sudipto Mukhopadhyay, Pleasanton, CA (US); Mao Ye, San Jose, CA (US); Benjamin Davini, San Jose, CA (US); Swapneel Ambre, Milpitas, CA (US)

(73) Assignee: VMware, Inc., Palo Alto, CA (US)

( * ) Notice: Subject to any disclaimer, the term of this patent is extended or adjusted under 35 U.S.C. 154(b) by 445 days.

(21) Appl. No.: 15/934,324

(22) Filed: Mar. 23, 2018

(65) Prior Publication Data

US 2019/0294463 A1  Sep. 26, 2019

(51) Int. Cl.
*G06F 9/455* (2018.01)
*G06F 8/65* (2018.01)

(52) U.S. Cl.
CPC ............ *G06F 9/45558* (2013.01); *G06F 8/65* (2013.01); *G06F 2009/45587* (2013.01)

(58) Field of Classification Search
CPC .................. G06F 9/45558; G06F 8/65; G06F 2009/45587
USPC ............................................................ 718/1
See application file for complete search history.

(56) References Cited

U.S. PATENT DOCUMENTS

| | | | |
|---|---|---|---|
| 6,370,249 B1 | 4/2002 | Van | |
| 8,245,579 B2 | 8/2012 | Wilner et al. | |
| 8,646,070 B1 | 2/2014 | Patsenker et al. | |
| 8,677,351 B2 | 3/2014 | Le et al. | |
| 8,775,577 B1 | 7/2014 | Alford et al. | |
| 8,843,929 B1 | 9/2014 | Oppenheimer et al. | |
| 9,110,732 B1 | 8/2015 | Forschmiedt et al. | |
| 9,292,275 B2 | 3/2016 | Bowen | |
| 9,294,284 B1 | 3/2016 | Mao | |
| 9,448,783 B2 | 9/2016 | Le et al. | |
| 9,654,548 B2 | 5/2017 | Arai et al. | |
| 9,740,870 B1 | 8/2017 | Shepard | |
| 9,819,496 B2 | 11/2017 | Lin et al. | |
| 9,881,160 B2 | 1/2018 | Batke et al. | |

(Continued)

OTHER PUBLICATIONS

"Application Programming Interface", Wikipedia, 2017 (Year: 2017).*

(Continued)

*Primary Examiner* — Bradley A Teets

(57) ABSTRACT

In a computer-implemented method for allocating a host of a pre-configured hyper-converged computing device to a workload domain, a pre-configured hyper-converged computing device including a plurality of hosts is managed, wherein the plurality of hosts is allocable to workload domains. A pool of unallocated hosts of the plurality of hosts is managed within the pre-configured hyper-converged computing device, wherein hosts of the pool of unallocated hosts have associated hypervisor versions. An allocation request to allocate at least one host of the pool of unallocated hosts to a workload domain is received, the allocation request including a requested hypervisor version of at least one host upon allocation. The at least one host is updated to the requested hypervisor version of the allocation request while the at least one host is in the pool of unallocated hosts.

13 Claims, 10 Drawing Sheets

(56) References Cited

U.S. PATENT DOCUMENTS

| | | | |
|---|---|---|---|
| 9,904,527 B1* | 2/2018 | Miller | G06F 8/443 |
| 10,013,267 B1 | 7/2018 | Wagner et al. | |
| 10,164,897 B1* | 12/2018 | Gussin | H04L 67/51 |
| 2002/0029170 A1 | 3/2002 | Gasser et al. | |
| 2002/0174256 A1 | 11/2002 | Bonilla et al. | |
| 2002/0199180 A1 | 12/2002 | Donaldson et al. | |
| 2003/0032425 A1 | 2/2003 | Kim et al. | |
| 2004/0204949 A1 | 10/2004 | Shaji et al. | |
| 2006/0190766 A1 | 8/2006 | Adler et al. | |
| 2008/0016357 A1 | 1/2008 | Suarez | |
| 2008/0244577 A1 | 10/2008 | Le et al. | |
| 2009/0210631 A1 | 8/2009 | Bosworth et al. | |
| 2009/0217362 A1 | 8/2009 | Nanda et al. | |
| 2009/0276771 A1 | 11/2009 | Nickolov et al. | |
| 2011/0061046 A1 | 3/2011 | Phillips | |
| 2011/0264718 A1 | 10/2011 | Chen et al. | |
| 2011/0296408 A1 | 12/2011 | Lo et al. | |
| 2012/0222025 A1 | 8/2012 | Pandit | |
| 2012/0284716 A1* | 11/2012 | Martins | G06F 8/63 718/1 |
| 2012/0324446 A1 | 12/2012 | Fries et al. | |
| 2013/0117554 A1 | 5/2013 | Ylonen | |
| 2013/0152047 A1 | 6/2013 | Moorthi et al. | |
| 2014/0082620 A1 | 3/2014 | Wagner et al. | |
| 2014/0143284 A1 | 5/2014 | Mccaffrey | |
| 2014/0143542 A1 | 5/2014 | Chang | |
| 2014/0365765 A1 | 12/2014 | Oswalt | |
| 2015/0095283 A1 | 4/2015 | Kristoffersen et al. | |
| 2015/0120928 A1 | 4/2015 | Gummaraju et al. | |
| 2015/0186175 A1 | 7/2015 | Van Der Walt et al. | |
| 2015/0222604 A1 | 8/2015 | Ylonen | |
| 2015/0254451 A1 | 9/2015 | Doane et al. | |
| 2015/0324587 A1 | 11/2015 | Batke et al. | |
| 2015/0331693 A1 | 11/2015 | Shanley et al. | |
| 2016/0036858 A1 | 2/2016 | Chieu et al. | |
| 2016/0055078 A1 | 2/2016 | Mcdonough et al. | |
| 2016/0170781 A1* | 6/2016 | Liguori | G06F 9/45558 718/1 |
| 2016/0203313 A1 | 7/2016 | El-Moussa et al. | |
| 2016/0224785 A1 | 8/2016 | Wagner et al. | |
| 2016/0239396 A1 | 8/2016 | Deng et al. | |
| 2016/0306977 A1 | 10/2016 | Zarakas et al. | |
| 2016/0350093 A1 | 12/2016 | Walker et al. | |
| 2017/0019387 A1 | 1/2017 | Ylonen | |
| 2017/0068530 A1 | 3/2017 | Berrange | |
| 2017/0147639 A1 | 5/2017 | Lee et al. | |
| 2017/0185438 A1 | 6/2017 | Thomas et al. | |
| 2017/0220404 A1 | 8/2017 | Polar Seminario | |
| 2017/0222981 A1 | 8/2017 | Srivastav et al. | |
| 2017/0351862 A1 | 12/2017 | Mohinder et al. | |
| 2017/0371683 A1 | 12/2017 | Devireddy et al. | |
| 2018/0088928 A1 | 3/2018 | Smith et al. | |
| 2019/0026140 A1* | 1/2019 | Mahajan | G06F 8/71 |
| 2019/0026141 A1* | 1/2019 | Mahajan | G06F 8/71 |
| 2019/0026162 A1* | 1/2019 | Mahajan | G06F 9/505 |
| 2019/0057132 A1 | 2/2019 | Kim | |

OTHER PUBLICATIONS

Hayden, et al., "Evaluating Dynamic Software Update Safety Using Systematic Testing", in IEEE Transactions on Software Engineering, vol. 38, No. 6, Nov.-Dec. 2012, pp. 1340-1354.

"LinuxQuestions, "Which is safer? Only ssh +scp for 2 users? Or ssh (1 user)+vsftpd (1 virtual user)," Sep. 18, 2011,", last retrieved from https://www.linuxquestions.org/questions/linux-security-4/which-is-safer-only-ssh-scp-for-2-users-or-ssh-1-user-vsftpd-1-virtual-user-903695/ (Year: 2011)., 2 pgs.

Ellingwood, "How to Add and Delete Users on an Ubuntu 14.04 VPS," DigitalOcean, Apr. 22, 2014, last retrieved from https://www.digitalocean.com/community/tutorials/how-to-add-and-delete-users-on-an-ubuntu-14-04-vps on Apr. 30, 2018 (Year: 2014)., 6 pgs.

* cited by examiner

ALLOCATING A HOST OF A PRE-CONFIGURED HYPER-CONVERGED COMPUTING DEVICE TO A WORKLOAD DOMAIN

BACKGROUND

In conventional virtual computing environments, creating and managing hosts (e.g., ESX hosts) and virtual machines may be complex and cumbersome. Oftentimes, a user, such as an IT administrator, requires a high level and complex skill set to effectively configure a new host to join the virtual computing environment. Moreover, management of workloads and workload domains, including allocation of hosts and maintaining consistency within hosts of particular workload domains, is often made difficult due to the distributed nature of conventional virtual computing environments.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description of the drawings should not be understood as being drawn to scale unless specifically noted.

DETAILED DESCRIPTION OF CERTAIN EMBODIMENTS

Figure 1:
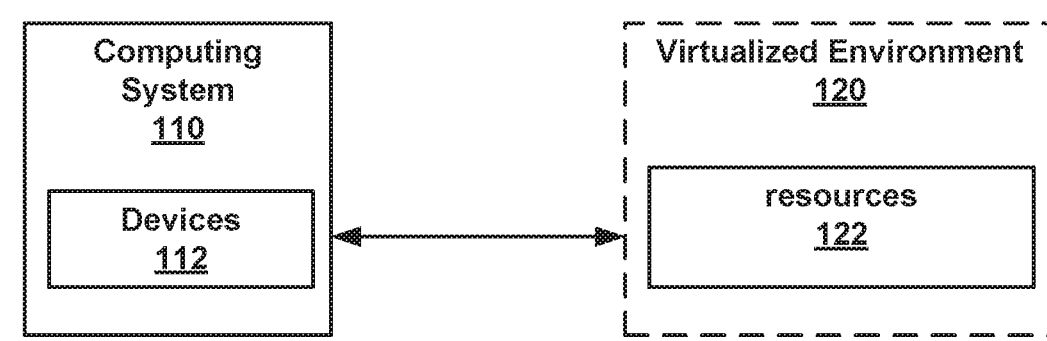
FIG. 1 depicts a block diagram of a virtual computing environment, according to various embodiments.

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be one or more self-consistent procedures or instructions leading to a desired result. The procedures are those requiring physical manipulations of physical quantities. Usually, although not necessarily, these quantities take the form of electrical or magnetic signals capable of being stored, transferred, combined, compared, and otherwise manipulated in an electronic device.

It should be borne in mind, however, that all of these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "managing," "maintaining," "receiving," "allocating," "updating," "resetting," "applying," "patching," "upgrading," "releasing," "provisioning," or the like, refer to the actions and processes of an electronic computing device or system such as: a host processor, a processor, a memory, a hyper-converged appliance, a software defined network (SDN) manager, a system manager, a virtualization management server or a virtual machine (VM), among others, of a virtualization infrastructure or a computer system of a distributed computing system, or the like, or a combination thereof. The electronic device manipulates and transforms data represented as physical (electronic and/or magnetic) quantities within the electronic device's registers and memories into other data similarly represented as physical quantities within the electronic device's memories or registers or other such information storage, transmission, processing, or display components.

Embodiments described herein may be discussed in the general context of processor-executable instructions residing on some form of non-transitory computer-readable storage medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example mobile electronic device described herein may include components other than those shown, including well-known components.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory computer-readable storage medium comprising instructions that, when executed, perform one or more of the methods described herein. The non-transitory computer-readable data storage medium may form part of a computer program product, which may include packaging materials.

The non-transitory computer-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as one or more motion processing units (MPUs), sensor processing units (SPUs), host processor(s) or core(s) thereof, digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structures or any other structure suitable for implementation of the techniques described herein. In addition, in some respects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an SPU/MPU and a microprocessor, a plurality of microprocessors, one or more microprocessors in conjunction with an SPU core, MPU core, or any other such configuration.

OVERVIEW OF DISCUSSION

Example embodiments described herein improve the performance of computer systems such as pre-configured hyper-converged computing devices by improving the management and allocation of hosts to workload domains. Workload domains are logical units of computing resources that are used for running workloads and hosting computing services. Hosts of pre-configured hyper-converged computing devices are allocated to workload domains, where hosts within a workload domain operate using hypervisors, each hypervisor of a particular hypervisor version.

Embodiments described herein provide methods for allocating a host of a pre-configured hyper-converged computing device to a workload domain. A pre-configured hyper-converged computing device including a plurality of hosts is managed, wherein the plurality of hosts is allocable to workload domains. A pool of unallocated hosts of the plurality of hosts is managed within the pre-configured hyper-converged computing device, wherein hosts of the pool of unallocated hosts have associated hypervisor versions. In one embodiment, the pool of unallocated hosts is isolated from network connectivity. An allocation request to allocate at least one host of the pool of unallocated hosts to a workload domain is received, the allocation request including a requested hypervisor version of at least one host upon allocation. In one embodiment, the requested hypervisor version is within a compatibility window of supported hypervisor versions. In one embodiment, the baseline hypervisor version is a hypervisor version used during provisioning of the pre-configured hyper-converged computing device.

In one embodiment, the at least one host is reset to a baseline hypervisor version. In one embodiment, the at least one host is reset to a baseline hypervisor version is performed by applying a boot bank image to the at least one host, the boot bank image for reverting the at least one host to the baseline hypervisor version. The at least one host is updated to the requested hypervisor version of the allocation request while the at least one host is in the pool of unallocated hosts. In one embodiment, the at least one host is updated to the requested hypervisor version by patching and upgrading the at least one host to the requested hypervisor version of the allocation request while the at least one host is in the pool of unallocated hosts. In one embodiment, responsive to the workload domain being deleted, the at least one host is released to the pool of unallocated hosts.

Embodiments of a Virtual Computing Environment

FIG. 1 depicts a block diagram that illustrates virtual computing environment (VCE) 100 (or virtualization infrastructure) that includes computing system 110 and virtualized environment 120, according to various embodiments. In general, computing system 110 and virtualized environment 120 are communicatively coupled over a network such that computing system 110 may access functionality of virtualized environment 120.

As will be described in further detail below, computing system 110 is implemented using virtualized environment 120. Also, while implementing the business functionality, computing system 110 might use some of resources 122.

In one embodiment, computing system 110 may be a system (e.g., enterprise system) or network that includes a combination of computer hardware and software. The corporation or enterprise utilizes the combination of hardware and software to organize and run its operations. To do this, system 110 uses resources 122 because system 110 typically does not have dedicated resources that can be given to the virtualized environment. For example, an enterprise system may provide various computing resource for various needs such as, but not limited to information technology (IT), security, email, etc.

In various embodiments, computing system 110 includes a plurality of devices 112. The devices are any number of physical and/or virtual machines. For example, in one embodiment, computing system 110 is a corporate computing environment that includes tens of thousands of physical and/or virtual machines. It is understood that a virtual machine is implemented in virtualized environment 120 that includes one or some combination of physical computing machines. Virtualized environment 120 provides resources 122, such as storage, memory, servers, CPUs, network switches, etc., that are the underlying hardware infrastructure for VCE 100.

The physical and/or virtual machines may include a variety of operating systems and applications (e.g., operating system, word processing, etc.). The physical and/or virtual machines may have the same installed applications or may have different installed applications or software. The installed software may be one or more software applications from one or more vendors. Each virtual machine may include a guest operating system and a guest file system.

Moreover, the virtual machines may be logically grouped. That is, a subset of virtual machines may be grouped together in a container (e.g., VMware vApp™). For example, three different virtual machines may be implemented for a particular workload. As such, the three different virtual machines are logically grouped together to facilitate in supporting the workload. The virtual machines in the logical group may execute instructions alone and/or in combination (e.g., distributed) with one another. Also, the container of virtual machines and/or individual virtual machines may be controlled by a virtual management system. The virtualization infrastructure may also include a plurality of virtual datacenters. In general, a virtual datacenter is an abstract pool of resources (e.g., memory, CPU, storage). It is understood that a virtual data center is implemented on one or some combination of physical machines.

In various embodiments, computing system 110 may be a cloud environment, built upon a virtualized environment 120. Computing system 110 may be located in an Internet connected datacenter or a private cloud computing center coupled with one or more public and/or private networks. Computing system 110, in one embodiment, typically couples with a virtual or physical entity in a computing environment through a network connection which may be a public network connection, private network connection, or some combination thereof. For example, a user may couple via an Internet connection with computing system 110 by accessing a web page or application presented by computing system 110 at a virtual or physical entity.

As will be described in further detail herein, the virtual machines are hosted by a host computing system. A host includes virtualization software that is installed on top of the hardware platform and supports a virtual machine execution space within which one or more virtual machines may be concurrently instantiated and executed.

In some embodiments, the virtualization software may be a hypervisor (e.g., a VMware ESX™ hypervisor, a VMware ESXi™ hypervisor, etc.) For example, if hypervisor is a VMware ESX™ hypervisor, then virtual functionality of the host is considered a VMware ESX™ server. It should be appreciated that multiple versions of the hypervisor may be concurrently available for use, some of which may be supported by a developer and some of which are no longer supported. For instance, a developer may define a compatibility window of supported hypervisor versions. For example, the developer may define the compatibility window as N–2, where N is the current version, such that the current version and the two prior versions are supported. Updated versions of the hypervisor may be made available for a number of reasons, such as enhancements, performance improvements, or to correct security vulnerabilities. Whether a hypervisor version is supported may also depend on the reasons for updating to a new version. For example, if a hypervisor version compromises the security integrity of the host or VMs, this hypervisor version may no longer be supported.

Additionally, a hypervisor or virtual machine monitor (VMM) is a piece of computer software, firmware or hardware that creates and runs virtual machines. A computer on which a hypervisor is running one or more virtual machines is defined as a host machine. Each virtual machine is called a guest machine. The hypervisor presents the guest operating systems with a virtual operating platform and manages the execution of the guest operating systems. Additional details regarding embodiments of structure and functionality of a host computer system are provided with respect to FIG. 2.

During use, the virtual machines perform various workloads. For example, the virtual machines perform the workloads based on executing various applications. The virtual machines can perform various workloads separately and/or in combination with one another.

Example Host Computer System

Figure 2:
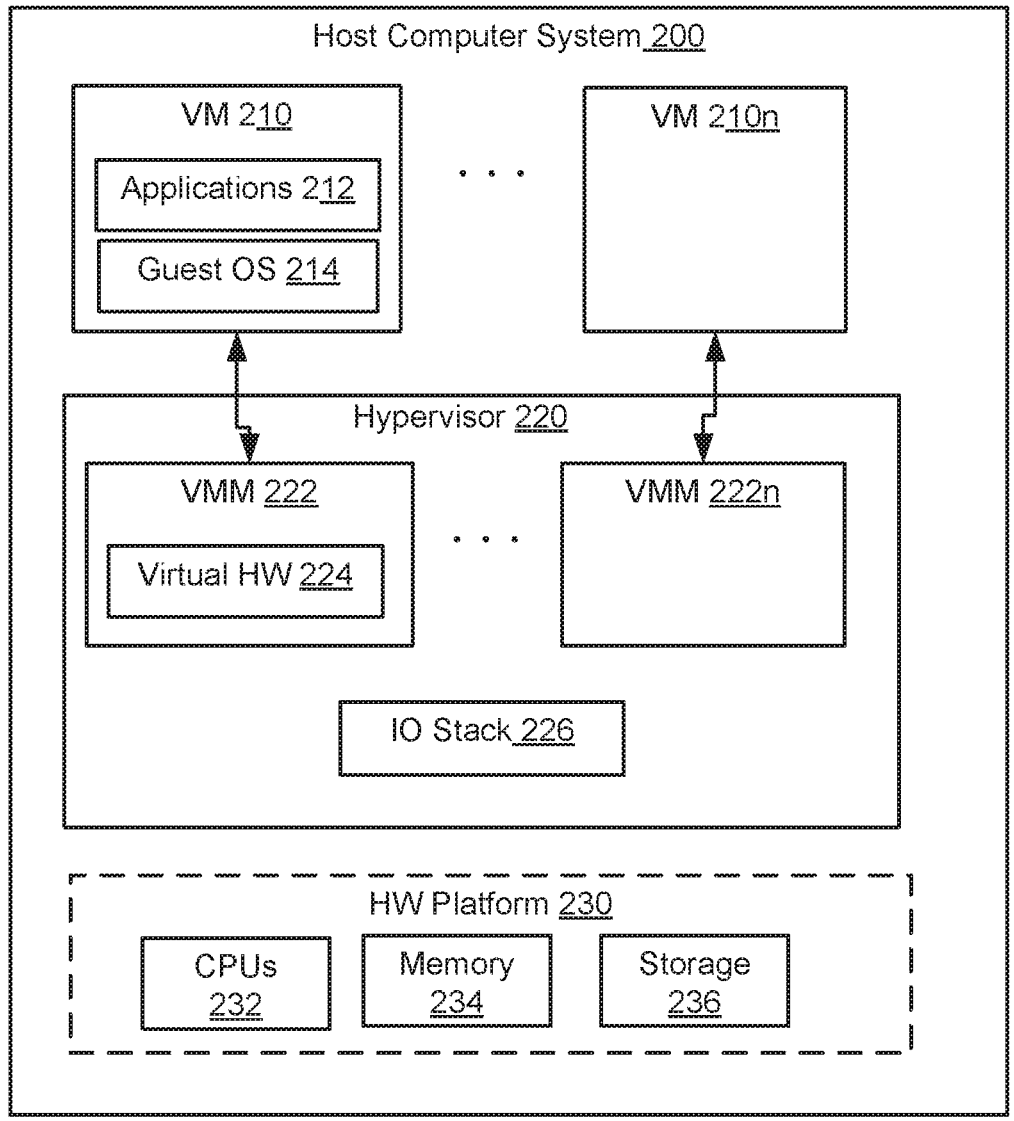
FIG. 2 depicts a block diagram of a host computing system, according to various embodiments.

FIG. 2 is a schematic diagram that illustrates a virtualized computer system that is configured to carry out one or more embodiments of the present invention. The virtualized computer system is implemented in a host computer system 200 including hardware platform 230. In one embodiment, host computer system 200 is constructed on a conventional, typically server-class, hardware platform.

Virtualized computer systems are implemented in host computer system 200 that includes hardware platform 230 (e.g., physical computing resources). Hardware platform 230 includes one or more central processing units (CPUs) 232, system memory 234, and storage 236. Hardware platform 230 may also include one or more network interface controllers (NICs) that connect host computer system 200 to a network, and one or more host bus adapters (HBAs) that connect host computer system 200 to a persistent storage unit.

Hypervisor 220 is installed on top of hardware platform 230 and supports a virtual machine execution space within which one or more virtual machines (VMs) may be concurrently instantiated and executed. Hypervisor 220 is of a particular version, where multiple versions may be available for use. Each virtual machine implements a virtual hardware platform that supports the installation of a guest operating system (OS) which is capable of executing applications. For example, virtual hardware 224 for virtual machine 210 supports the installation of guest OS 214 which is capable of executing applications 212 within virtual machine 210.

Example hypervisors include, without limitation, VMware ESXi™ hypervisors (e.g., ESXi 6.0, ESXi 6.0.U2, ESXi 6.5, ESXi 6.5.U2, etc.) Moreover, it should be appreciated that hypervisors are updated over time to different versions of the hypervisor (e.g., to provide improved functionality and/or to address security concerns). In accordance with various embodiments, hypervisor versions can refer to a particular release of a hypervisor and/or a particular build of a hypervisor. For example, a security patch applied to a hypervisor may refer to a new version of the hypervisor.

Guest OS 214 may be any of the well-known commodity operating systems, and includes a native file system layer, for example, either an NTFS or an ext3FS type file system layer. Example operating systems include, without limitation, Windows operating systems (e.g., Windows 7, Windows 8, Windows 10, or Windows Server 2012 R2), UNIX operating systems (e.g., Mac OS X server), and Linux operating systems.

IOs issued by guest OS 214 through the native file system layer appear to guest OS 214 as being routed to one or more virtual disks provisioned for virtual machine 210 for final execution, but such IOs are, in reality, reprocessed by IO stack 226 of hypervisor 220 and the reprocessed IOs are issued, for example, through an HBA to a storage system.

Virtual machine monitor (VMM) 222 and 222n may be considered separate virtualization components between the virtual machines and hypervisor 220 (which, in such a conception, may itself be considered a virtualization "kernel" component) since there exists a separate VMM for each instantiated VM. Alternatively, each VMM may be considered to be a component of its corresponding virtual machine since such VMM includes the hardware emulation components for the virtual machine. It should also be recognized that the techniques described herein are also applicable to hosted virtualized computer systems. Furthermore, although benefits that are achieved may be different, the techniques described herein may be applied to certain non-virtualized computer systems.

Examples of an Appliance

Figure 3:
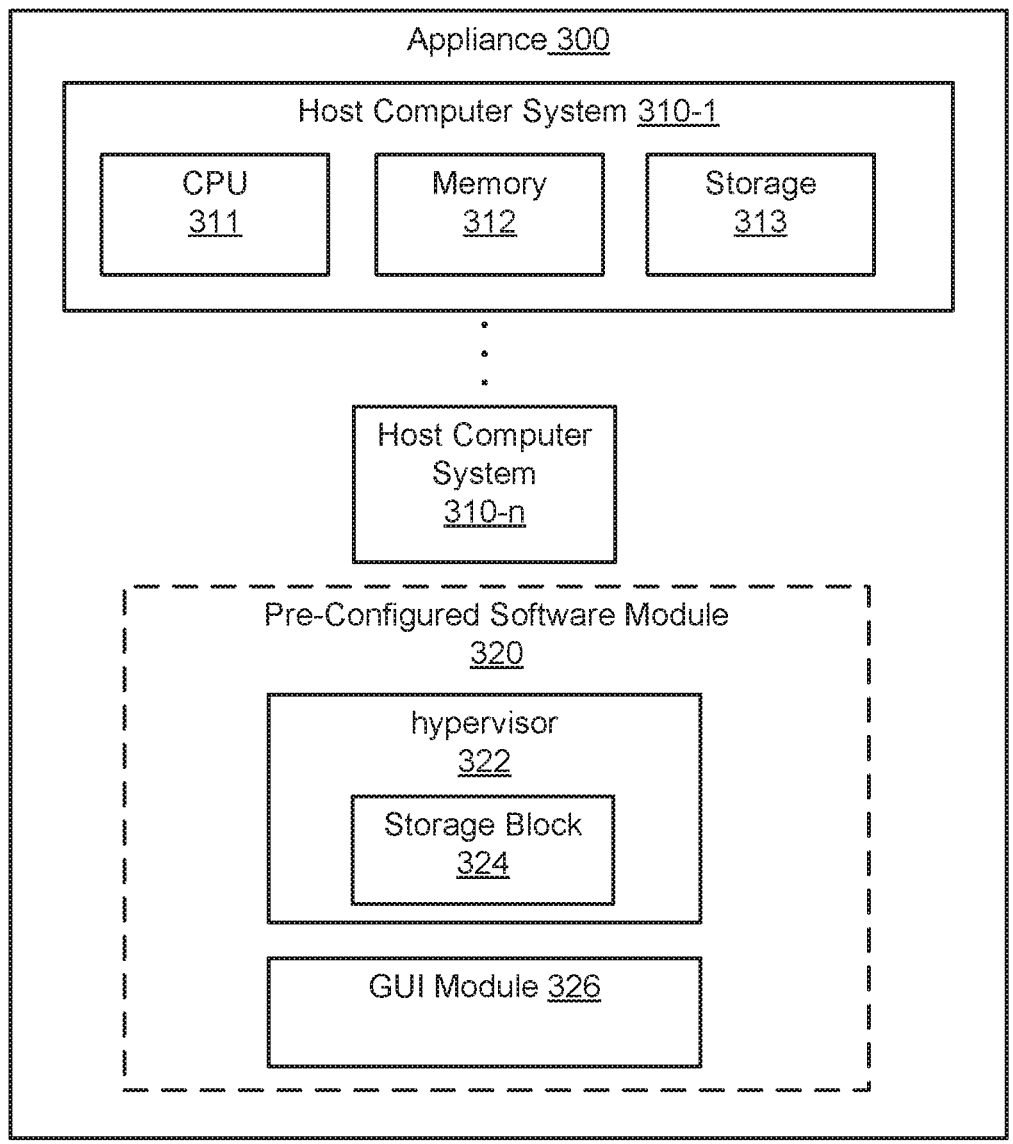
FIG. 3 depicts a block diagram of an appliance, according to various embodiments.

FIG. 3 depicts an embodiment of appliance 300. Appliance 300 is a computing device that includes the requisite physical hardware and software to create and manage a virtualization infrastructure. Appliance 300 is also referred to herein as a pre-configured hyper-converged computing device. In general, a hyper-converged computing device includes pretested, pre-configured and pre-integrated storage, server and network components, including software, that are located in an enclosure. Moreover, the hyper-converged computing device includes a hypervisor that supports a virtualization infrastructure.

Based on the pre-configured hardware and software disposed within appliance 300, appliance 300 enables a user to simply and quickly create a virtualization infrastructure and deploy virtual machines shortly after the appliance is powered on for the first time.

Appliance 300 includes, among other things, at least one host computer system. For example, host computer system 310-1 through host computer system 310-n. Host computer system 310-1 includes a central processing unit (CPU) 311, memory 312, and storage 313. It should be appreciated that other host computer systems (e.g., host computer system 310-n) each include a CPU, memory, and storage similar to host computer system 310-n.

Appliance 300 is scalable. That is appliance can be scaled to include more than one host computer system. For example, appliance 300 can initially have a single host computer system. However, additional host computer system may be included in appliance 300.

In one embodiment, appliance 300 is able to deploy a plurality of virtual machines in the virtualization infrastructure. For example, based on the hardware and software incorporated in appliance 300, appliance 300 is able to deploy pre-set number of virtual machines (e.g., 75 virtual machines, 150 virtual machines, etc.).

Moreover, each host computer system may be considered a server or host computing system. That is, each host computer system is able to independently host a number of virtual machines. For example, host computer system 310-1 is able to host a first set of virtual machines, while other host computer systems are each able to independently host other sets of virtual machines, respectively.

The host computer systems are independent of one another, and are not required to share any functionality with one another. Appliance 300 does not include a backplane. As such, the host computer systems are isolated from one another and therefore independent of one another.

CPU 311 may be, but is not limited to, a dual socket CPU (e.g., Intel Xeon™ CPUs, 4-core to 6-core). Memory 312 may be, but is not limited to, 128 gigabytes (GB). Storage may be, but is not limited to, three drive slots per node. Such as a solid state drive (SSD) (e.g., an SSD up to 800 GB), and two hard disk drives (HDD) (e.g., HDDs up to 8 terabytes (TB)).

Additionally, the appliance may include various external interfaces, such as but not limited to, serial, network RJ-45 (10000 NIC), graphics, management RJ-45 (100/10000 NIC), power (in front and in rear), UID (in front and in rear) and a USB.

The appliance may also include Component Interconnect Express (PCIe) expansion slots, and a disk controller with pass through capabilities. It should be appreciated that the appliance may include other hardware attributes that are compatible with supporting a virtualization infrastructure.

In one embodiment, appliance 300 is a rackable 2 U/4 Node appliance. That is, appliance 300 is two rack units in height and includes four host computer system (e.g., host computer systems 310-1 through 310-n).

The size of a piece of rack-mounted equipment is described as a number in "U" or "RU" (rack unit). One rack unit is often referred to as "1 U", 2 rack units as "2 U" and so on. "U" is a unit of measure that describes the height of equipment designed to mount in a rack (e.g., 19-inch rack or a 23-inch rack). The 19-inch (482.6 mm) or 23-inch (584.2 mm) dimension refers to the width of the equipment mounting frame in the rack including the frame. In some instances, one rack unit is 1.75 inches (4.445 cm) high.

In another embodiment, appliance 300 is a 4 U/4 Node appliance. That is, appliance 300 is four rack units in height and includes four host computer system (e.g., host computer system 310-1 through 310-n).

Appliance 300 includes software to support a virtualization infrastructure. That is, appliance 300 includes code or instructions stored on physical hardware in appliance 300, that when executed by a processor, supports a virtualization infrastructure. For instance, appliance 300 includes pre-configured software module 320.

It should be appreciated that the software installed on appliance 300 (e.g., software module 320) is stored in a storage device. In various embodiments, the software may be installed in a single host computer system or may be distributed in various host computer systems. In another embodiment, the software may be stored in a storage device within appliance 300 but is outside of the host computer systems.

During operation of the appliance, the software may be executed by one or more CPUs in a single host computer system or the execution may be distributed amongst various CPUs in various host computer systems.

Software module 320 includes, among other things, hypervisor 322. As described above, a hypervisor is installed on top of hardware platform (e.g., CPU, memory and storage) and supports a virtual machine execution space within which one or more virtual machines (VMs) may be concurrently instantiated and executed.

In various embodiments, hypervisor 322 is VMware ESX™ hypervisor or a VMware ESXi™ hypervisor. It is noted that "ESX" is derived from the term "Elastic Sky X" coined by VMware™.

It should be appreciated that software module 320, in one embodiment, includes a suite of software tools for cloud computing (e.g., VMware vSphere™ VCenter™) that utilizes various components such as a VMware ESX/ESXi hypervisor. Example hypervisors include, without limitation, VMware ESXi™ hypervisors (e.g., ESXi 6.0, ESXi 6.0.U2, ESXi 6.5, ESXi 6.5.U2, etc.) Moreover, it should be appreciated that hypervisors are updated over time to different versions of the hypervisor (e.g., to provide improved functionality and/or to address security concerns). In accordance with various embodiments, hypervisor versions can refer to a particular release of a hypervisor and/or a particular build of a hypervisor. For example, a security patch applied to a hypervisor may refer to a new version of the hypervisor.

Software module 320 includes storage block 324. Storage block 324 is a logical partition of storage (e.g., storage 313) in appliance 300. In other words, storage block 324 is virtual storage. In one embodiment, storage block 324 is a virtual storage area network (VSAN). As a result, the VSAN allows traffic to be isolated within specific portions of a storage area network. Storage block 324 is imbedded or integral with hypervisor 322. In other words, the data path for storage is in the hypervisor layer.

Various advantages occur due to the storage block integrated with the hypervisor. In one example, the VSAN communicates with the ESX layer at a kernel level and is not required to communicate over a network via an Ethernet connection. As such, communication latency between the storage block and hypervisor is reduced.

GUI module 326 is code or instructions that enable the utilization of a graphical user interface to creating and managing appliances (e.g., ESX hosts) and virtual machines of the virtualization infrastructure. The graphical user interface is described in further detail below.

It is noted that software module 320 is proprietary software of a single entity (e.g., VMware™). For example, hypervisor 322, storage block 324, and GUI module 326 are proprietary software code to a single entity. That is, hypervisor 322, storage block 324, and GUI module 326 are not open source code, and therefore require a license agreement between the licensor (e.g., VMware™) and a purchaser of the appliance that includes the proprietary software module. In one embodiment, the license agreement is an end-user license agreement (EULA). The EULA establishes the purchaser's right to use the software (e.g., software module 320) and the hardware of appliance 300.

Figure 4:
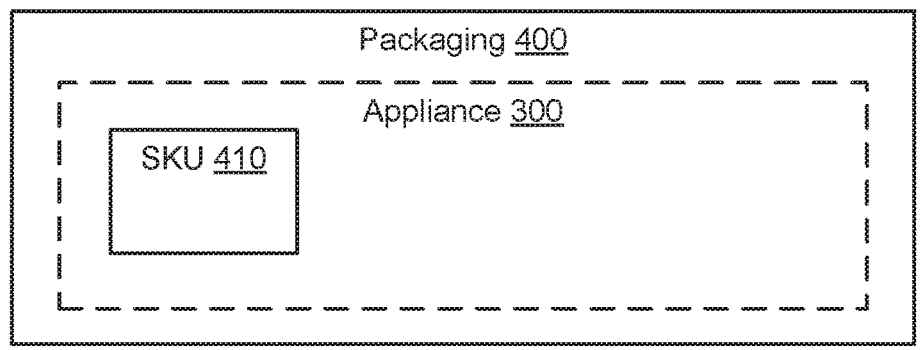
FIG. 4 depicts a block diagram of a side-view of an appliance offered for sale, according to various embodiments.

FIG. 4 depicts an embodiment of a side-view of an appliance offered for sale. In one embodiment, appliance 300 is offered for sale as a single stock keeping unit (SKU). For example, appliance 300 is disposed in packaging 400 and SKU 410 is on packaging 400. Accordingly, appliance 300 is offered for sale as a single SKU.

More specifically, appliance 300, as described herein, is pre-configured with the requisite hardware and software for employing a virtualization infrastructure. Therefore, subsequent the purchase of appliance 300 as a single SKU, appliance 300 is not required to include any additional hardware and/or software to support and manage a virtualization infrastructure.

Upon powering on appliance 300 for the first time, a single EULA is displayed to an end-user. Because software module 320 is proprietary to a single entity (e.g., VMware™), only a single EULA, provided by the single entity, is displayed to the purchasing end-user. More specifically, at least hypervisor 322 (e.g., ESX/ESXi hypervisor) and storage block 324 (e.g., VSAN) are proprietary to a single entity (e.g., VMware™). Therefore, only a single EULA pertaining to hypervisor 322 and storage block 324 is displayed and provided to an end-user.

Upon acceptance of the EULA, appliance 300 is enabled to operate and manage a virtualization infrastructure, and deploy virtual machines in the virtualization infrastructure.

It should be appreciated that upon first powering on appliance 300 and accepting the single EULA, a virtualization infrastructure is able to be rapidly created and a virtual machine is able to be deployed within the virtualization infrastructure within minutes (e.g., 15 minutes). Moreover, the virtualization infrastructure is able to be managed and controlled by an end-user that is not required to have high-level IT administrative training and experience.

In one embodiment, appliance 300 is able to deploy a plurality of virtual machines in the virtualization infrastructure. For example, based on the hardware and software incorporated in appliance 300, appliance 300 is able to deploy pre-set number of virtual machines (e.g., 75 virtual machines, 150 virtual machines, etc.).

Examples of Virtualization Infrastructures

Figure 5:
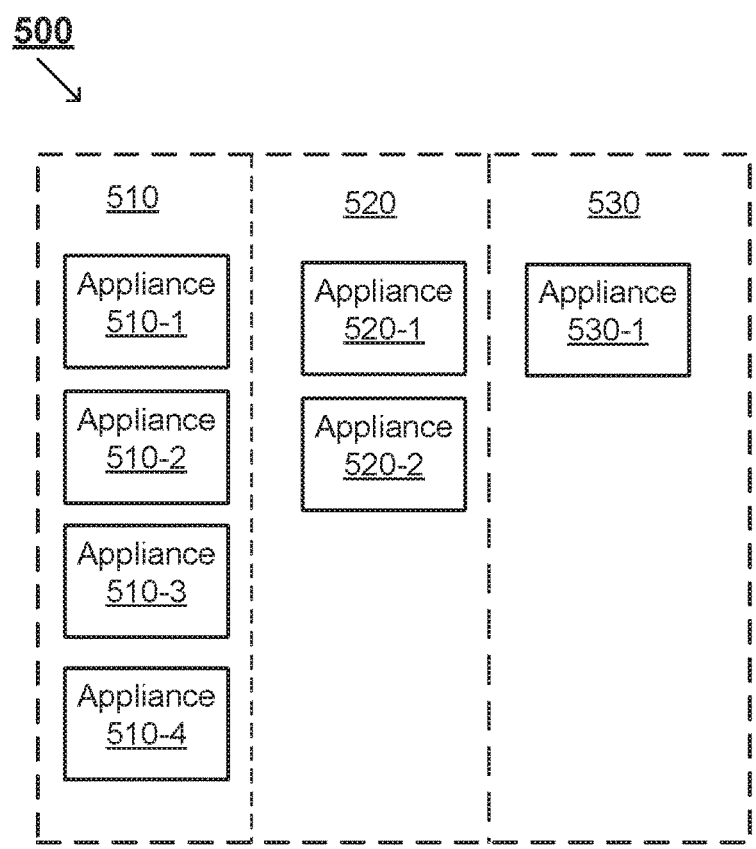
FIG. 5 depicts a block diagram of a virtualization infrastructure, according to various embodiments.

FIG. 5 depicts an embodiment of various appliances supporting virtualization infrastructure 500.

In one embodiment, appliances may be grouped together to increase the functionality of creating and managing a virtualization infrastructure. For example, appliance 510-1 was initially utilized to deploy a plurality of virtual machines, at location 510. However, additional virtual machines were desired but appliance 510-1, alone, was not able to meet the demand for the desired additional virtual machines. As such, additional appliances 510-2, 510-3, and 510-4 were purchased and grouped together to meet the demand of the additional virtual machines. In particular, the cluster of appliances which are communicatively coupled together, act as a single platform for managing the virtualization infrastructure and deploying virtual machines.

Similarly, appliance 520-1 was initially utilized to deploy a plurality of virtual machines, at location 520. However, additional virtual machines were desired but appliance 520-1, alone, was not able to meet the demand for the desired additional virtual machines. As such, additional appliance 520-2 was purchased and grouped together with appliance 520-1 to meet the demand of the additional virtual machines.

It should be appreciated that any number of appliances may be grouped together. For example, two, three, four, five or more appliances may be grouped together provided that the functionality of the appliances, as a whole, are able to act as a single platform for managing the virtualization infrastructure.

Additionally, the appliances and/or clusters of appliances may be located at various locations. For example, a first cluster of appliances may be located at a main office of an enterprise, while a second cluster of appliances are located at a remote office/branch office (ROBO).

In another example, virtualization infrastructure 500 is a virtualization infrastructure of a large enterprise having various building and infrastructure at various geo-locations. In such an example, information technology (IT) is located at a first location (e.g., location 510), an engineering team is located at a second location (e.g., location 520) and sales team is located at location 530.

Accordingly, appliances 510-1 through 510-4 may be grouped together at a first location 510 to support the demand for virtual machines of the IT team, appliances 510-1 and 510-2 are grouped together at location 520 to support the demand of virtual machines for the engineering team, and appliance 530-1 is located at location 530 to support the demand of virtual machines for the sales team.

As will be described in further detail below, GUI module 326 enables a GUI to facilitate the creating and managing of hosts and virtual machines. Moreover, the GUI is able to facilitate in managing the virtualization infrastructure by displaying the attributes of the appliances. For example, the GUI would display the particular health, resources used, and the like, for each of the appliances in virtualization infrastructure 500.

Example Virtual Environment

Figure 6:
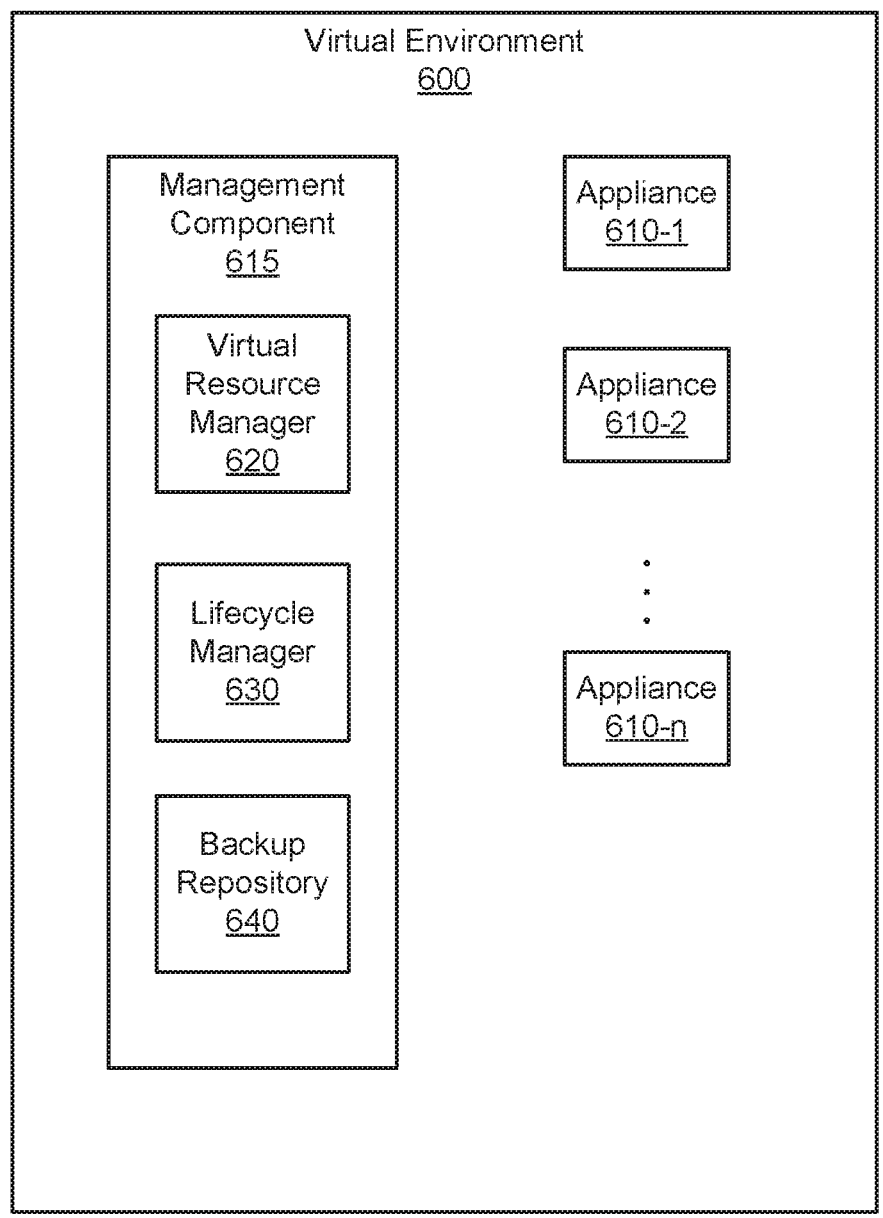
FIG. 6 illustrates an example virtual environment, in accordance with an embodiment.

FIG. 6 illustrates an example virtual environment 600 (e.g., a cloud environment) in accordance with an embodiment. Virtual environment 600 may include one or more appliances. Virtual environment 600, in one embodiment, includes appliance cluster 610 that includes appliances 610-1 through 610-n (e.g., a plurality of appliances 300 of FIG. 3). Appliances 610-1 through 610-n are communicatively coupled and act as a platform for managing the virtualization infrastructure and deploying virtual machines. VMware Cloud Foundation (VCF) is an example virtual environment 600.

Virtual environment 600 also includes management component 615 that includes virtual resource manager 620 and lifecycle manager 630. It should be appreciated that management component 615 may be implemented in a computing device, either virtual or physical, within virtual environment 600, and is communicatively coupled to appliances 610-1 through 610-n. Management component 615 may be implemented within one or more of appliances 610-1 through 610-n.

In various embodiments, virtual resource manager 620 is for managing allocation of hosts of appliances 610-1 through 610-n. For example, virtual resource manager 620 operates to make resources of appliances 610-1 through 610-n (e.g., storage hardware, computing hardware, and networking hardware) work together to achieve installation/operation and optimizing the resources for improved performance within virtual environment 600. Virtual resource manager 620 translates application requirements to physical infrastructure requirements. In accordance with various described embodiments, workload domains are mapped to a management cluster deployment (e.g., a vSphere cluster of VMware, Inc.) in a deployment (e.g., a rack deployment). Moreover, as additional appliances are added to virtual environment 600, cross-rack clusters become an option. Examples disclosed herein facilitate improved workload domain configuration and management.

As utilized herein, a workload domain is an abstraction that can be applied to a number of different types of compute workloads. This allows the administrator to deploy capacity for specific workload types using a policy-driven approach on top of physical resources. In various embodiments, a workload domain has a set of policies that are configurable by the user during the deployment process. For example, a workload domain can be configured according to capacity required (e.g., host count and storage requirements), availability required, performance required, and networks required.

In some embodiments, a workload domain is a grouping of hosts of appliances 610-1 through 610-n. It should be appreciated that a workload domain can include any number of hosts, and that hosts of a workload domain con be distributed across any number of appliances. In accordance with various embodiments, hosts of a workload domain have the same hypervisor version.

In various embodiments, management component 615 is a group of physical machines and/or virtual machines (VM) that host core cloud infrastructure components necessary for managing a software defined data center (SDDC) in a cloud computing environment that supports customer services. Cloud computing allows ubiquitous, convenient, on-demand network access to a shared pool of configurable computing resources. A cloud computing customer can request allocations of such resources to support services required by those customers. For example, when a customer requests to run one or more services in the cloud computing environment, one or more workload domains may be created based on resources in the shared pool of configurable computing resources. Examples disclosed herein enable customers to define different domain types, security, capacity, availability, and performance requirements for establishing workload domains in server rack deployments without requiring the users to have in-depth knowledge of server rack hardware and configurations.

Virtual resource manager 620 enables the ability for streamlined and automated data center operations and the delivery of service offerings, such as virtual infrastructure (VI) and virtual desktop infrastructure (VDI) environments, based on a SDDC or cloud-based architecture. In some embodiments, an instance of virtual resource manager 620 is deployed on each appliance 610-1 through 610-n as part of a managed cluster of services.

Virtual resource manager 620 manages the physical hardware resources (e.g., hosts) of appliances 610-1 through 610-n. For example, virtual resource manager can create a workload domain out of the underlying physical hardware resources of appliances 610-1 through 610-n. It should be appreciated that underlying physical hardware resources of a workload domain may span one or more physical racks (or smaller units such as a hyper-appliance or half rack) such that virtual resource manager 620 handles physical management of those resources.

Virtual resource manager 620 tracks available capacity in appliances 610-1 through 610-n, maintains a view of a logical pool of virtual resources, and translates logical resource provisioning to allocation of physical hardware resources. Virtual resource manager 620 interfaces with components of the virtual environment 600 to manage and present a logical view of underlying resources such as hosts and clusters. Virtual resource manager 620 also uses the logical view for orchestration and provisioning of workloads.

Lifecycle manager 630 enables automated updating of components of virtual environment 600. In some embodiments, lifecycle manager 630 is communicatively coupled to a software repository for accessing software updates. For example, lifecycle manager 630 receives notification of update availability for a component of virtual environment 600, downloads the update bundle, selects update targets, schedules the update, and applies the update to the target according to the schedule.

In some embodiments, management component 615 also includes backup repository 640 for storing baseline hypervisor versions for the hosts of appliances 610-1 through 610-n. In one embodiment, a boot bank folder from a host during initial provisioning of the host is copied into backup repository 640. In one embodiment, where the hypervisor is an ESXi hypervisor, the stage.tgz file from each host is also copied into backup repository 640 during initial provisioning. Initial provisioning typically occurs prior to shipping to a customer, such that restoring to the baseline hypervisor version is also referred to as a factory reset.

Example Host Allocations within a Virtual Environment

Figure 7:
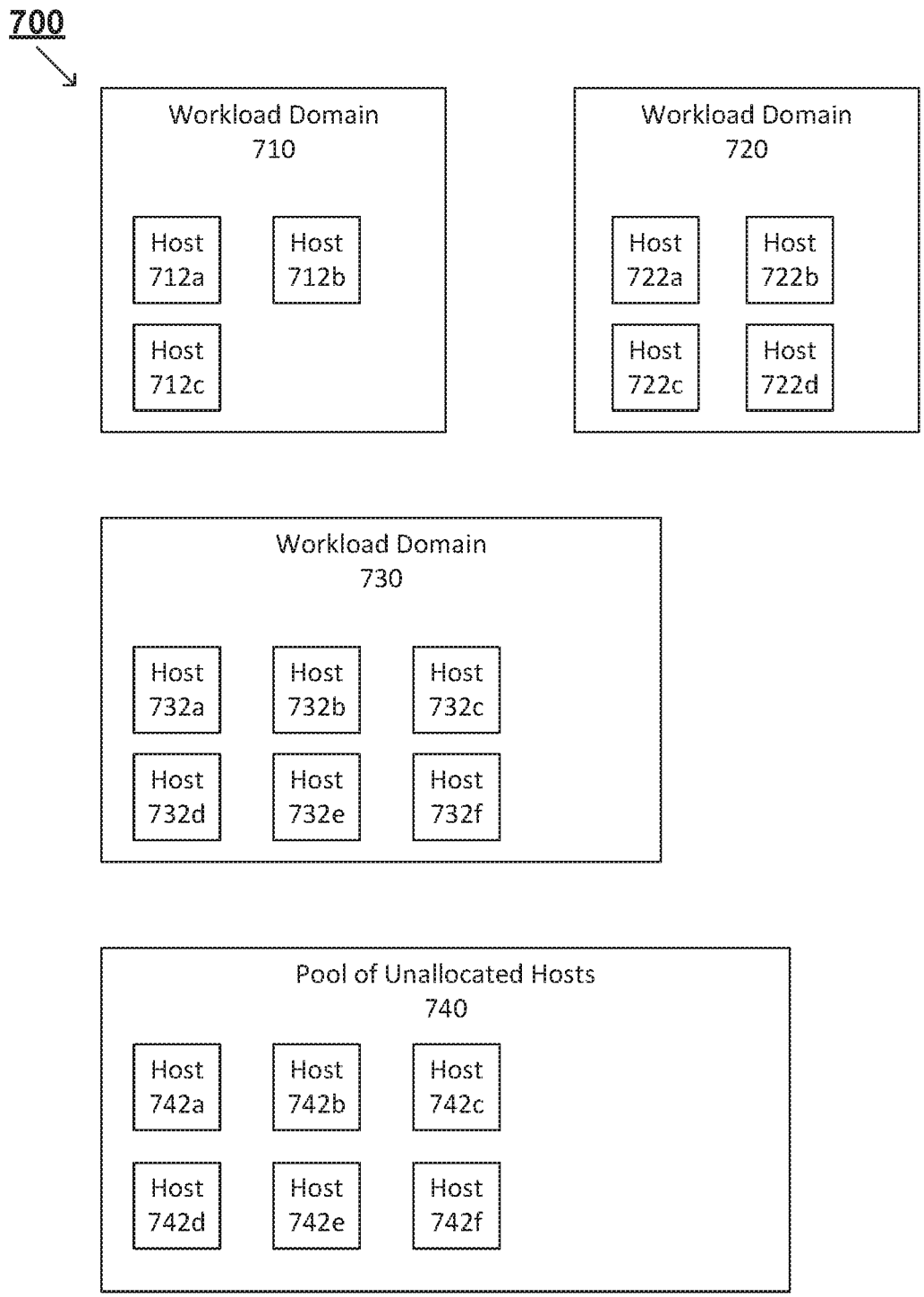
FIG. 7 illustrates an example allocation of hosts to workload domains, in accordance with an embodiment.

FIG. 7 illustrates an example allocation 700 of hosts to workload domains 710, 720, and 730, in accordance with an embodiment. Workload domains 710, 720, and 730, execute on hosts of appliances (e.g., appliances 610-1 through 610-n of FIG. 6). In various embodiments, hosts are allocated to workload domains 710, 720, and 730 according to demand and availability. For example, workload domains 710, 720, and 730 may be used to provision capacity based on user inputs that specify one or more of domain type, security, availability requirements, performance requirements, and capacity requirements. Based on these user inputs, management component 615 determines whether a deployment is possible. If a deployment is possible, the management component 615 determines an optimal host set that meets the user-specified requirements. It should be appreciated that allocation of the hosts of workload domains 710, 720, and 730 may be based on a policy-driven approach that can be specified and changed by a user.

Hosts can be added to or removed from workload domains 710, 720, and 730, and workload domains may be added or deleted. When hosts are released from workload domains they get released to pool of unallocated hosts 740 so that they can be allocated to other workload domains. In one embodiment, upon being released to pool of unallocated hosts 740, the host maintains the hypervisor version it is operating, where the hypervisor version may be maintained until a future allocation of the host to a workload domain.

As illustrated in FIG. 7, workload domain 710 includes hosts 712a through 712c, workload domain 720 includes hosts 722a through 722d, and workload domain 730 includes hosts 732a through 732f. Pool of unallocated hosts 740 includes hosts 742a through 742f. It should be appreciated that an allocation can include any number of workload domains and hosts (subject to availability), of which the illustrated allocation 700 is an example.

Pool of unallocated hosts 740 is isolated from network connectivity. As such, hosts 742a through 742f are isolated from public and/or private networks. This provides enhanced protection against security vulnerabilities of the hypervisor versions of hosts 742a through 742f. It is possible that hosts within pool of unallocated hosts 740 have hypervisor versions with security vulnerabilities, and isolating these hosts from general network connectivity limits potential exploitation of these security vulnerabilities. In various described embodiments, upon allocation, a host is updated to a supported hypervisor version while still in pool of unallocated hosts 740, such that the potential security vulnerabilities are not exposed over any external networks.

In accordance with various described embodiments, hosts allocated to a particular workload domain have a hypervisor of a particular hypervisor version. In some embodiments, the hosts allocated to a particular workload domain have the same hypervisor version. In one example, hosts 712a through 712c of workload domain 710 have the same hypervisor version. However, it should be appreciated that workload domains need not have the same hypervisor version as other workload domains. Moreover, hosts can only be allocated to one workload domain at any given time, and may not be allocated to multiple workload domains at the same time.

In general, each host has a hypervisor version that is within a range of supported hypervisor versions. In various embodiments, the range of supported hypervisor allows for backward compatibility of hypervisor versions for a certain number of hypervisor version releases. It should be appreciated that it is possible, with the passage of time and upgrades to the hypervisor versions on the hosts, that on a single appliance with hosts allocated to more than one workload domain may have hosts with distinct hypervisor versions. For example, if an appliance has ten hosts, with five hosts on a first workload domain and five hosts on a second workload domain, it is possible that the hosts on the first workload domain have hypervisor version N (e.g., $HV_x$) and the hosts on the second workload domain have a hypervisor version N-1 (e.g., $HV_{N-1}$).

Figure 8:
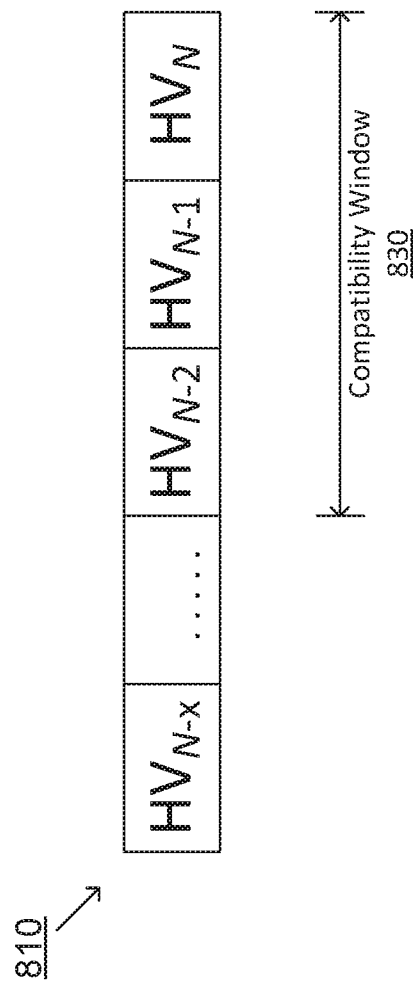
FIG. 8 illustrates an example compatibility window of supported hypervisor versions, in accordance with various embodiments.

FIG. 8 illustrates an example compatibility window 830 of supported hypervisor versions, in accordance with various embodiments. Upgrades of hypervisor versions 810 of hosts of appliances are supported compatibility window 830. A hypervisor may have multiple versions, ranging from a current hypervisor version $HV_{N-1}$ to an initial hypervisor version $HV_{N-x}$. Compatibility window 830 defines the supported hypervisor versions, as it is possible that not all released hypervisor versions are supported. In the illustrated embodiment, compatibility window 830 supports current hypervisor version $HV_N$ and the two previous hypervisor versions $HV_{N-1}$ and $HV_{N-2}$. Hypervisor versions prior to $HV_{N-2}$ are not supported. As illustrated, hypervisor version $HV_{N-x}$ is not within compatibility window 830, and therefore is not supported for use within a host of the described embodiments when the host is allocated to a workload.

It should be appreciated that a baseline hypervisor version for a host will initially fall within compatibility window 830, but may eventually fall outside of compatibility window 830. In accordance with some embodiments, upon allocation, a host within pool of unallocated hosts 740, is first reset to the baseline hypervisor version for the host (e.g., the baseline hypervisor version stored at backup repository 640). In such embodiments, subsequent to restoring the host to the baseline hypervisor version, the hypervisor version of the host is updated (e.g., upgraded and patched) to the requested hypervisor version. It should be appreciated that the requested hypervisor version may be based on a user request or a system request, and will fall within compatibility window 830.

It should be appreciated that compatibility window 830 may apply to versions of any hypervisor. Moreover, it should be appreciated that the embodiments illustrated in compatibility window 830 is an example, and that other ranges are possible. For example, compatibility window 830 may include the current hypervisor version to the previous three hypervisor versions. Furthermore, it should be appreciated that the ranges of supported hypervisor versions need not include all hypervisor versions between the first hypervisor version of a range and the last hypervisor version of the range. For example, a hypervisor version that was previously supported may include a security flaw that requires it no longer be supported. In such a situation, the range of supported hypervisor versions would not include the non-supported hypervisor version.

Figure 9:
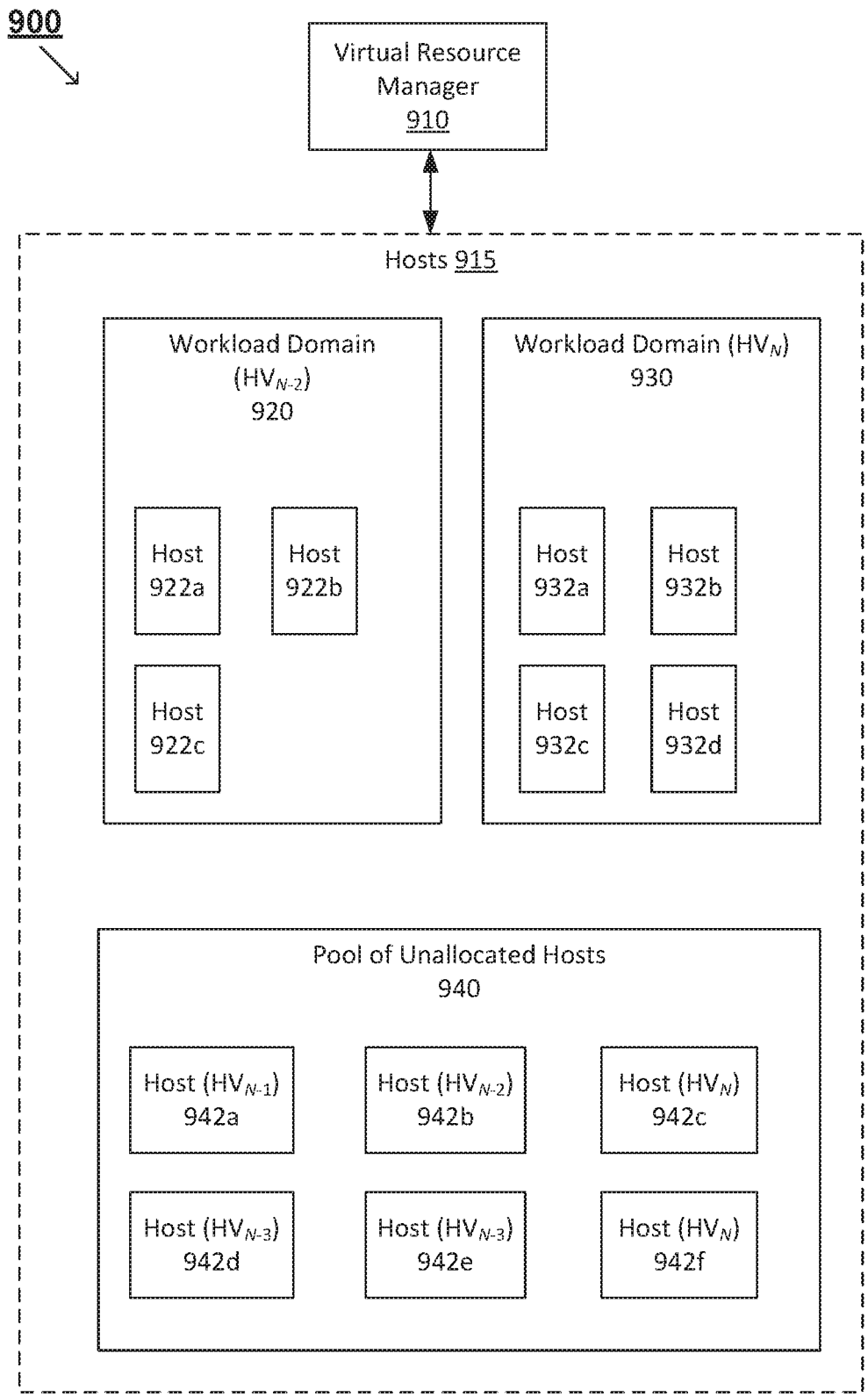
FIG. 9 illustrates an example block diagram of components of virtualization infrastructure for managing hosts of appliances, in accordance with various embodiments.

In one embodiment, a host is provisioned to a workload domain from a pool of unallocated hosts according to a hypervisor version of the workload domain. FIG. 9 illustrates an example block diagram of components of virtualization infrastructure 900 for managing hosts 915 of appliances (e.g., appliance 610-1 through 620-n of FIG. 6), in accordance with various embodiments. It should be appreciated that virtualization infrastructure 900 may include other components, as described above, and that FIG. 9 illustrates certain components so as to not obfuscate the described embodiments.

With reference to FIG. 9, as illustrated, virtualization infrastructure 900 includes virtual resource manager 910 and hosts 915 which are allocable to workload domains 920 and 930. As described above, it should be appreciated that hosts 915 can be included within one or more appliances, such that hosts of different appliances can be allocated to a workload domain and that hosts of the same appliance can be allocated to different workload domains. Virtualization infrastructure 900 supports a range of supported hypervisor versions within a compatibility window. In the illustrated example, the compatibility window includes $HV_{N-2}$ through $HV_N$, where other hypervisor versions (e.g., $HV_{N-3}$) are not supported.

Hosts 922a through 922c are allocated to workload domain 920, where workload domain 920 includes hosts having hypervisor version $HV_{N-2}$, and hosts 932a through 932d are allocated to workload domain 930, where workload domain 930 includes hosts having hypervisor version $HV_N$.

Pool of unallocated hosts 940 includes hosts of virtualization infrastructure 900 that are not allocated to a workload domain. It should be appreciated that host of pool of unallocated hosts 940 can have any associated hypervisor version between the baseline hypervisor version through a current hypervisor version. For example, upon provisioning, all hosts of pool of unallocated hosts 940 will have hypervisors of the baseline hypervisor version. As hosts are allocated and released back to pool of unallocated hosts 940, the hosts have the hypervisor version of the workload domain allocation. As illustrated, pool of unallocated hosts 940 includes hosts 942a through 942f, where host 942a has hypervisor version $HV_{N-1}$, host 942b has hypervisor version $HV_{N-2}$, hosts 942c and 942f have hypervisor version $HV_N$, and hosts 942d and 942e has hypervisor version $HV_{N-3}$.

In one embodiment, virtual resource manager 910 is configured to receive an allocation request to allocate a host to workload domain 920. It should be appreciated that an allocation request may request more than one host be added to a workload domain. The allocation request includes a requested hypervisor version of the newly allocated host. In one embodiment, the requested hypervisor version is within a compatibility window of supported hypervisor versions. In response to the command, virtual resource manager selects a host from pool of unallocated hosts 940 to add to workload domain 920.

In one embodiment, the selected host is reset to a baseline hypervisor version. In one embodiment, the baseline hypervisor version is a hypervisor version used during provisioning of the pre-configured hyper-converged computing device. In one embodiment, a boot bank image for the host is retrieved to reset the host to the baseline hypervisor version (e.g., from backup repository 640). The boot bank image is applied to the host to reset the host to the baseline hypervisor version. It should be appreciated that where the host is already operating the baseline hypervisor version, it may not be necessary to reset the host to the baseline hypervisor version. For example, if the particular host has never been allocated to a workload domain, it may not be necessary to reset the particular host. In another example, where the particular host may have previously been allocated to a workload domain, it may be desirable to reset the hypervisor version using the boot bank image, so as to restore all settings, data, etc., to the initial condition.

Virtual resource manager 910 is configured to select an unallocated host from pool of unallocated hosts 940 and update the hypervisor version of the selected host such that it has the same hypervisor version as workload domain 930. In one embodiment, the update is performed by patching and upgrading the hypervisor version to the requested hypervisor version. In one embodiment, the update is performed by exposing an application programming interface (API) from lifecycle manager 630 to update a given host to a requested hypervisor version. Lifecycle manager 630 maintains a list of patches and upgrades for particular hypervisor version updates, and can execute installation of the patches and upgrades while the host is still in pool of unallocated hosts 940.

In one embodiment, virtual resource manager 910 is configured to receive a command to remove a host from a workload domain. Responsive to such a command, virtual resource manager is operable to release the host to pool of unallocated host 940. In one embodiment, the command to remove the host from the workload domain is received in response to the workload domain being deleted. In one embodiment, upon being released to pool of unallocated hosts 940, the host maintains the hypervisor version it is operating, where the hypervisor version may be maintained until a future allocation of the host to a workload domain.

Figure 10:
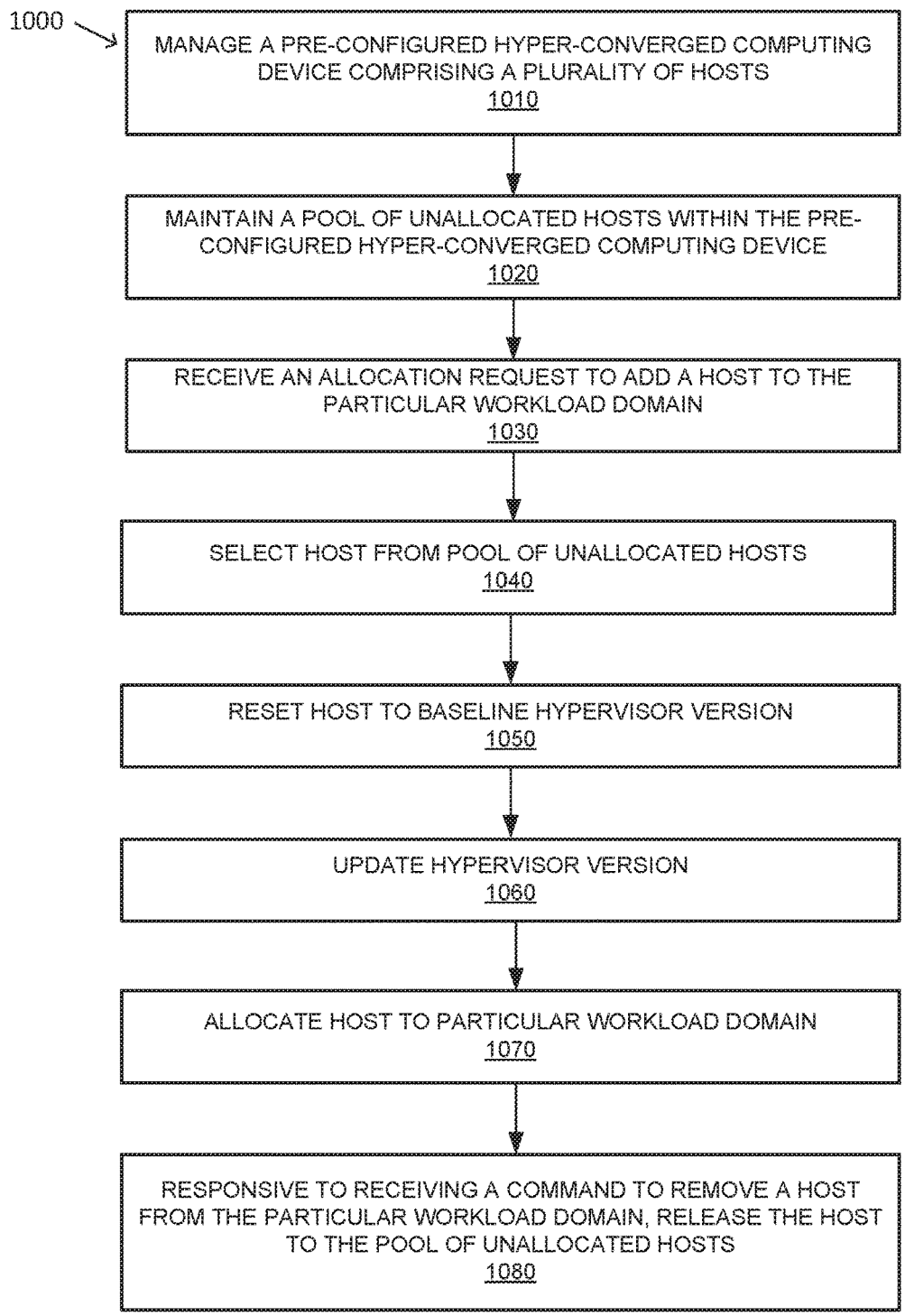
FIG. 10 depicts a flow diagram for allocating a host of a pre-configured hyper-converged computing device to a workload domain, according to various embodiments.
Figure 11:
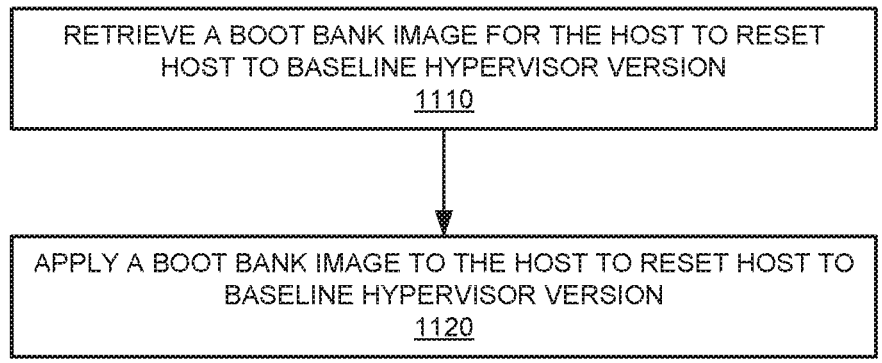
FIG. 11 depicts a flow diagram for resetting a hypervisor version of a host of a pre-configured hyper-converged computing device, according to various embodiments.
Figure 12:
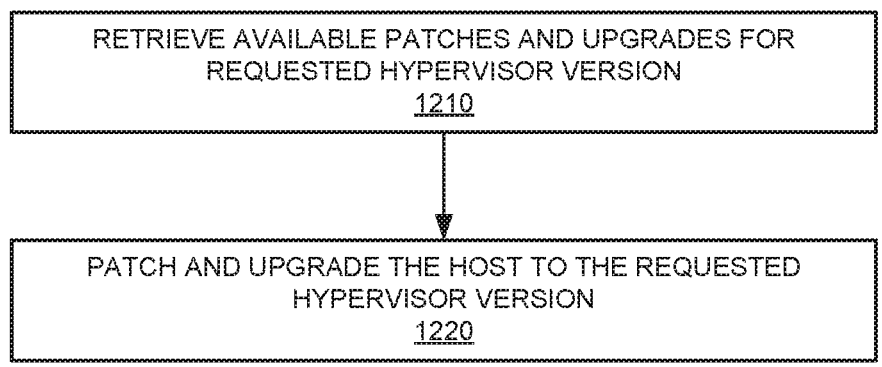
FIG. 12 depicts a flow diagram for updating a hypervisor version of a host of a pre-configured hyper-converged computing device, according to various embodiments.

Example Methods of Operation of Managing Hypervisor Versions of Hosts of a Pre-Configured Hyper-Converged Computing Device The following discussion sets forth in detail the operation of some example methods of operation of embodiments. With reference to FIGS. 10 through 12, flow diagrams 1000, 1100, and 1200, illustrate example procedures used by various embodiments. Flow diagrams 1000, 1100, and 1200 include some procedures that, in various embodiments, are carried out by a processor under the control of computer-readable and computer-executable instructions. In this fashion, procedures described herein and in conjunction with flow diagrams 1000, 1100, and 1200 are, or may be, implemented using a computer, in various embodiments. The computer-readable and computer-executable instructions can reside in any tangible computer readable storage media. Some non-limiting examples of tangible computer readable storage media include random access memory, read only memory, magnetic disks, solid state drives/"disks," and optical disks, any or all of which may be employed with computer environments (e.g., computer system 110 and/or virtualized environment 120). The computer-readable and computer-executable instructions, which reside on tangible computer readable storage media, are used to control or operate in conjunction with, for example, one or some combination of processors of the computer environments and/or virtualized environment. It is appreciated that the processor(s) may be physical or virtual or some combination (it should also be appreciated that a virtual processor is implemented on physical hardware). Although specific procedures are disclosed in flow diagrams 1000, 1100, and 1200 such procedures are examples. That is, embodiments are well suited to performing various other procedures or variations of the procedures recited in flow diagrams 1000, 1100, and 1200. Likewise, in some embodiments, the procedures in flow diagrams 1000, 1100, and 1200 may be performed in an order different than presented and/or not all of the procedures described in one or more of these flow diagrams may be performed. It is further appreciated that procedures described in flow diagrams 1000, 1100, and 1200 may be implemented in hardware, or a combination of hardware with firmware and/or software provided by appliance 300.

FIG. 10 depicts a flow diagram 1000 of a method for allocating a host of a pre-configured hyper-converged computing device to a workload domain, according to various embodiments. At procedure 1010 of flow diagram 1000, a pre-configured hyper-converged computing device comprising a plurality of hosts is managed, where the plurality of hosts is allocable to workload domains. At procedure 1020, a pool of unallocated hosts is maintained within the pre-configured hyper-converged computing device, where the unallocated hosts of the pool have associated hypervisors versions. In one embodiment, the pool of unallocated hosts is isolated from network connectivity.

At procedure 1030, an allocation request to allocate at least one host to a particular workload domain is received, where the allocation request includes a requested hypervisor version of at least one host upon allocation. In one embodiment, the requested hypervisor version is within a compatibility window of supported hypervisor versions. At procedure 1040, at least one host from the pool of unallocated hosts is selected. At procedure 1050, in accordance with an embodiment, the at least one host is reset to a baseline hypervisor version. In one embodiment, the baseline hypervisor version is a hypervisor version used during provisioning of the pre-configured hyper-converged computing device. FIG. 11 depicts flow diagram 1100 for resetting a hypervisor version of a host of a pre-configured hyper-converged computing device, according to various embodiments.

With reference to FIG. 11, at procedure 1110 of flow diagram 1100, a boot bank image for the host is retrieved to reset the host to the baseline hypervisor version. At procedure 1120, the boot bank image is applied to the host to reset the host to the baseline hypervisor version.

With reference to FIG. 10, at procedure 1060, the hypervisor version of the at least one host is updated to the requested hypervisor version while the at least one host is in the pool of unallocated hosts. In one embodiment, the update includes upgrading and patching the hypervisor version. FIG. 12 depicts flow diagram 1200 for updating a hypervisor version of a host of a pre-configured hyper-converged computing device, according to various embodiments.

With reference to FIG. 12, at procedure 1210 of flow diagram 1200, available patches and upgrades for the requested hypervisor version are retrieved to update the hypervisor version to the requested hypervisor version. At procedure 1220, the patches and upgrades are applied to the host to update the hypervisor version to the requested hypervisor version. In one embodiment, where the host is reset to the baseline hypervisor version, available patches and upgrades are retrieved to update the baseline hypervisor version to the requested hypervisor version.

With reference to FIG. 10, as shown at procedure 1070, the at least one host of the pool of unallocated hosts is allocated to the particular workload domain. In one embodiment, as shown at procedure 1080, responsive to receiving a command to remove a host from the particular workload domain, the host is released to the pool of unallocated hosts. In one embodiment, the command to remove the host from the particular workload domain is created in response to the particular workload domain being deleted.

It is noted that any of the procedures, stated above, regarding flow diagrams 1000, 1100, and 1200 may be implemented in hardware, or a combination of hardware with firmware and/or software. For example, any of the procedures are implemented by a processor(s) of a cloud environment and/or a computing environment.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, hypervisor, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A computer-implemented method for allocating a host of a pre-configured hyper-converged computing device to a workload domain, the method comprising:
   managing a pre-configured hyper-converged computing device comprising a plurality of hosts, wherein the plurality of hosts is allocable to workload domains;
   maintaining a pool of unallocated hosts of the plurality of hosts within the pre-configured hyper-converged computing device, wherein hosts of the pool of unallocated hosts have associated hypervisor versions and wherein the pool of unallocated hosts is isolated from network connectivity;
   receiving an allocation request to allocate at least one host of the pool of unallocated hosts to a workload domain, the allocation request comprising a requested hypervisor version of at least one host upon allocation;
   resetting the at least one host to a baseline hypervisor version by applying a boot bank image to the at least one host, the boot bank image for reverting the at least one host to the baseline hypervisor version;
   updating the at least one host from the baseline hypervisor version to the requested hypervisor version of the allocation request while the at least one host is in the pool of unallocated hosts such that potential security vulnerabilities are not exposed over an external network due to the pool of unallocated hosts being isolated from network connectivity, wherein the updating is initiated by a management component communicatively coupled to the pre-configured hyper-converged computing device; and
   subsequent to the updating the at least one host to the requested hypervisor version, allocating the at least one host to the workload domain, wherein the at least one host has the requested hypervisor version and wherein the workload domain is configured with network access.

2. The computer-implemented method of claim 1, wherein the baseline hypervisor version is a hypervisor version used during provisioning of the pre-configured hyper-converged computing device.

3. The computer-implemented method of claim 1, wherein the updating the at least one host comprises:
   patching and upgrading the at least one host to the requested hypervisor version of the allocation request while the at least one host is in the pool of unallocated hosts.

4. The computer-implemented method of claim 1, wherein the requested hypervisor version is within a compatibility window of supported hypervisor versions.

5. The computer-implemented method of claim 1, further comprising:
   responsive to the workload domain being deleted, releasing the at least one host to the pool of unallocated hosts.

6. The computer-implemented method of claim 1, wherein the updating the at least one host from the baseline hypervisor version to the requested hypervisor version of the allocation request while the at least one host is in the pool of unallocated hosts comprises:
   exposing an application programming interface (API) from a lifecycle manager of the management component to update the at least one host to the requested hypervisor version of the allocation request.

7. A non-transitory computer readable storage medium having computer readable program code stored thereon for causing a computer system to perform a method for allocating a host of a pre-configured hyper-converged computing device to a workload domain, the method comprising:
   managing a pre-configured hyper-converged computing device comprising a plurality of hosts, wherein the plurality of hosts is allocable to workload domains;
   maintaining a pool of unallocated hosts of the plurality of hosts within the pre-configured hyper-converged computing device, wherein hosts of the pool of unallocated hosts have associated hypervisor versions and wherein the pool of unallocated hosts is isolated from external network connectivity;
   receiving an allocation request to allocate at least one host of the pool of unallocated hosts to a workload domain, the allocation request comprising a requested hypervisor version of at least one host upon allocation;
   resetting the at least one host to a baseline hypervisor version by applying a boot bank image to the at least one host, the boot bank image for reverting the at least one host to the baseline hypervisor version;
   updating the at least one host from the baseline hypervisor version to the requested hypervisor version of the allocation request while the at least one host is in the pool of unallocated hosts such that potential security vulnerabilities are not exposed over an external network due to the pool of unallocated hosts being isolated from external network connectivity, wherein the updating is initiated by a management component communicatively coupled to the pre-configured hyper-converged computing device; and
   subsequent to the updating the at least one host to the requested hypervisor version, allocating the at least one host to the workload domain, wherein the at least one host has the requested hypervisor version and wherein the workload domain is configured with network access.

8. The non-transitory computer readable storage medium of claim 7, wherein the baseline hypervisor version is a hypervisor version used during provisioning of the pre-configured hyper-converged computing device.

9. The non-transitory computer readable storage medium of claim 7, wherein the updating the at least one host comprises:
   patching and upgrading the at least one host to the requested hypervisor version of the allocation request while the at least one host is in the pool of unallocated hosts.

10. The non-transitory computer readable storage medium of claim 7, wherein the requested hypervisor version is within a compatibility window of supported hypervisor versions.

11. The non-transitory computer readable storage medium of claim 7, the method further comprising:
    responsive to the workload domain being deleted, releasing the at least one host to the pool of unallocated hosts.

12. A pre-configured hyper-converged computing device for supporting a virtualization infrastructure comprising:
    a plurality of hosts, wherein a host of the plurality of hosts comprises a hypervisor, wherein the plurality of hosts is allocable to workload domains, and wherein hosts allocated to a particular workload domain comprise a hypervisor having a requested hypervisor version; and
    a non-transitory computer-readable storage medium encoded with a computer program communicably coupled to a processor to:
      manage allocation of the plurality of hosts to workload domains; and maintain a pool of unallocated hosts of the plurality of hosts within the pre-configured hyper-converged computing device, wherein hosts of the pool of unallocated hosts have associated hypervisor versions and wherein the pool of unallocated hosts is isolated from external network connectivity;

reset at least one host to a baseline hypervisor version prior to an update by applying a boot bank image to the at least one host, the boot bank image for reverting the at least one host to the baseline hypervisor version;

update at least one host of the pool of unallocated hosts from the baseline hypervisor version to a requested hypervisor version in response to receiving an allocation request to allocate the at least one host to a workload domain, wherein the update is performed while the at least one host is in the pool of unallocated hosts such that potential security vulnerabilities are not exposed over an external network due to the pool of unallocated hosts being isolated from external network connectivity, and wherein the update is initiated by a management component communicatively coupled to the pre-configured hyper-converged computing device; and allocate the at least one host to the workload domain subsequent to updating the at least one host to the requested hypervisor version, wherein the at least one host has the requested hypervisor version and wherein the workload domain is configured with network access.

13. The pre-configured hyper-converged computing device of claim 12, wherein the processor is further to:

release the at least one host to the pool of unallocated hosts in response to the workload domain being deleted.

\* \* \* \* \*